(12) United States Patent
Schwartz et al.

(10) Patent No.: US 7,757,903 B2
(45) Date of Patent: Jul. 20, 2010

(54) FEEDER ASSEMBLY FOR BULK SOLIDS

(75) Inventors: Louis S. Schwartz, Bethlehem, PA (US); Robert H. Lilly, Bethlehem, PA (US)

(73) Assignee: FLSmidth A/S (DK)

( * ) Notice: Subject to any disclaimer, the term of this patent is extended or adjusted under 35 U.S.C. 154(b) by 729 days.

(21) Appl. No.: 11/584,387

(22) Filed: Oct. 20, 2006

(65) Prior Publication Data

US 2008/0093391 A1    Apr. 24, 2008

(51) Int. Cl.
G01F 11/00 (2006.01)
G01F 11/20 (2006.01)
A01K 61/02 (2006.01)
B65G 25/00 (2006.01)
F23K 3/18 (2006.01)

(52) U.S. Cl. .................. 222/368; 222/410; 222/271; 222/218; 222/636; 414/195; 119/51.04; 119/52.1; 110/276

(58) Field of Classification Search .................. 222/368, 222/367, 389, 386.5, 181.1, 181.2, 181.3, 222/370, 268, 267, 271, 226, 236, 250, 227, 222/273, 217, 218, 229, 231, 232, 329, 410, 222/411, 412, 636; 119/51.01, 52.1, 53, 119/56.1, 57.91, 57.92, 61.2, 51.04; 414/167, 414/195; 110/276, 115
See application file for complete search history.

(56) References Cited

U.S. PATENT DOCUMENTS

| | | | | |
|---|---|---|---|---|
| 2,200,713 A * | 5/1940 | Ericson et al. | ........... | 52/742.13 |
| 2,644,724 A * | 7/1953 | Haavard | ........... | 406/64 |
| 2,858,212 A * | 10/1958 | Durant et al. | ........... | 162/237 |
| 3,206,254 A * | 9/1965 | Mylting | ........... | 406/65 |
| 3,681,192 A * | 8/1972 | Reinhall | ........... | 162/246 |
| 4,268,205 A * | 5/1981 | Vacca et al. | ........... | 414/219 |
| 4,379,664 A * | 4/1983 | Klein et al. | ........... | 406/68 |
| 4,823,993 A * | 4/1989 | Siegel et al. | ........... | 222/345 |
| 5,044,837 A * | 9/1991 | Schmidt | ........... | 406/85 |
| 5,189,965 A * | 3/1993 | Hobbs et al. | ........... | 111/178 |
| 5,381,933 A * | 1/1995 | Beirle et al. | ........... | 222/368 |
| 5,544,995 A * | 8/1996 | Ogawa et al. | ........... | 414/219 |
| 5,592,889 A * | 1/1997 | Bourgault | ........... | 111/174 |
| 6,045,009 A * | 4/2000 | Beirle et al. | ........... | 222/368 |
| 6,206,247 B1 * | 3/2001 | Ingram | ........... | 222/368 |
| 6,237,816 B1 * | 5/2001 | Boritzki | ........... | 222/368 |
| 6,837,403 B2 * | 1/2005 | Mothersbaugh | ........... | 222/368 |

* cited by examiner

*Primary Examiner*—Kevin P Shaver
*Assistant Examiner*—Stephanie E Tyler
(74) *Attorney, Agent, or Firm*—Daniel DeJoseph; Aaron M. Pile

(57) ABSTRACT

A feeder for feeding bulk material into a high pressure conveying line. The feed assembly comprises a rotary feeder that has a material inlet for receiving bulk material from a low pressure source and a material outlet for discharging the bulk material into a higher pressure conveying line which is a source of leakage gas into the rotary feeder. The feeder has venting means to vent leakage gas through the material inlet without such leakage gas contacting the bulk material entering the feeder.

11 Claims, 4 Drawing Sheets

VIEW "B-B"

FEEDER ASSEMBLY FOR BULK SOLIDS

FIELD OF THE INVENTION

The present invention relates to a feeder assembly for feeding solid material into a pressurized conveying line, and more specifically for feeding bulk solids into a conveying line maintained at a higher pressure than the feed source of the bulk solids. The assembly comprises a rotary feeder having a plurality of vanes and baffles that bridge adjacent vanes. The vanes and baffles in combination form rotating feed pockets for receiving bulk solids and a material feed tube for feeding the bulk solids into the rotary feeder. The material feed tube has a feed spout that preferably has a rectangular cross section and has sides that closely align with the edges of the baffles utilized to form the pockets of the rotary feeder.

BACKGROUND OF THE INVENTION

Rotary feeders are known in the art for metering bulk material into pneumatic conveying lines. Rotary feeders of the type to which this invention pertains typically consist of a housing having a generally cylindrical inner wall and end walls at opposite ends thereof to form a cylindrical chamber therein, an upwardly facing inlet opening for receiving material from a material holding vessel such as a storage bin for bulk material communicating with the housing chamber, and a downwardly facing outlet opening also communicating with the housing chamber and communicable with and discharging material into a high pressure conveying line such as a pneumatic conveying line or the like, where the material is conveyed by a fluid under pressure to a desired location. The rotary feeders also comprise a shaft journaled in the end walls of the housing, and a rotor mounted on or formed integrally with the shaft within the housing chamber, and a plurality of vanes projecting radially from such rotor providing a plurality of circumferentially spaced pockets adapted to receive material that falls into the pocket under the force of gravity from the inlet, to convey such material through the rotor chamber and discharge it through the outlet, where the material falls by gravity into the conveying line. Intermediate the inlet and outlet openings, the vane ends pass in close spaced relationship with the inside of the housing.

When the rotary feeder is installed in a pneumatic conveyor system, the pressure at the inlet opening can be considerably less than the pressure at the outlet opening. It is normally desirable to ensure that pressurized fluid (such as air or another gaseous fluid) cannot flow from the outlet back toward the inlet to thereby interfere with the feeding of material into the rotary feeder. It is known to provide a slot-like venting opening in the housing of the feeder before the inlet opening when seen in direction of rotation of the rotor. Through this venting opening leakage gas from the upward moving pocket that is void of bulk material is discharged. Fluid can still however, leak from the outlet into the inlet of the rotary feeder by traveling various pathways from the higher-pressure space (the space in communication with the outlet) toward and into the lower-pressure space (the space which communicates with the inlet of the housing). Such pathways may run adjacent to the inner end wall of the housing of the feeder, as there will be at least some (even extremely small) play in order to avoid jamming of the rotor shaft in the end walls in the housing and also between the vane ends and the inside of the cylinder walls of the housing. Although such leakage may not significantly effect the ability to convey many bulk materials that are charged into conveying lines, it will effect the efficient charging of materials having a lowered bulk density into a high pressurized conveying line, wherein such conveying fluid leakage may fluidize and or aerate the material to be charged when the material comes in contact with the leakage fluid at the rotary feeder inlet. Such bulk materials having a lowered bulk density include trona, hydrated lime and magnesium oxide, and it is these and other low bulk density materials that are effectively charged into high pressurized conveying lines utilizing the apparatus and method of the present invention.

OBJECTS OF THE INVENTION

An object of the invention is to provide a feeder assembly which utilizes a rotary feeder to charge low density bulk material into a high pressurized conveying line, such as a pneumatic conveying line, wherein fluid leakage from the conveying line is effectively separated from, and does not come in contact with, the bulk material at the point where such material enters the rotary feeder.

Another object of the invention is to provide a novel and improved means for venting such leakage air from the housing of a rotary feeder.

A further object of the invention is to provide a conveyor which employs a feeder assembly of the above outlined character.

BRIEF DESCRIPTION OF THE DRAWINGS

The above and other objects and features of the present invention will be more apparent from the following description of the preferred embodiments with reference to the accompanying drawings, wherein.

DETAILED DESCRIPTION OF THE INVENTION

It should be understood at the outset that identical reference numbers on the various drawing sheets refer to identical elements of the invention. It should also be understood that the following description is intended to completely describe the invention and to explain the best mode of practicing the invention known to the inventors but is not intended to be limiting in interpretation of the scope of the claims. The drawings are not necessarily to scale, emphasis instead being placed upon illustrating principles of the invention.

Figure 1:
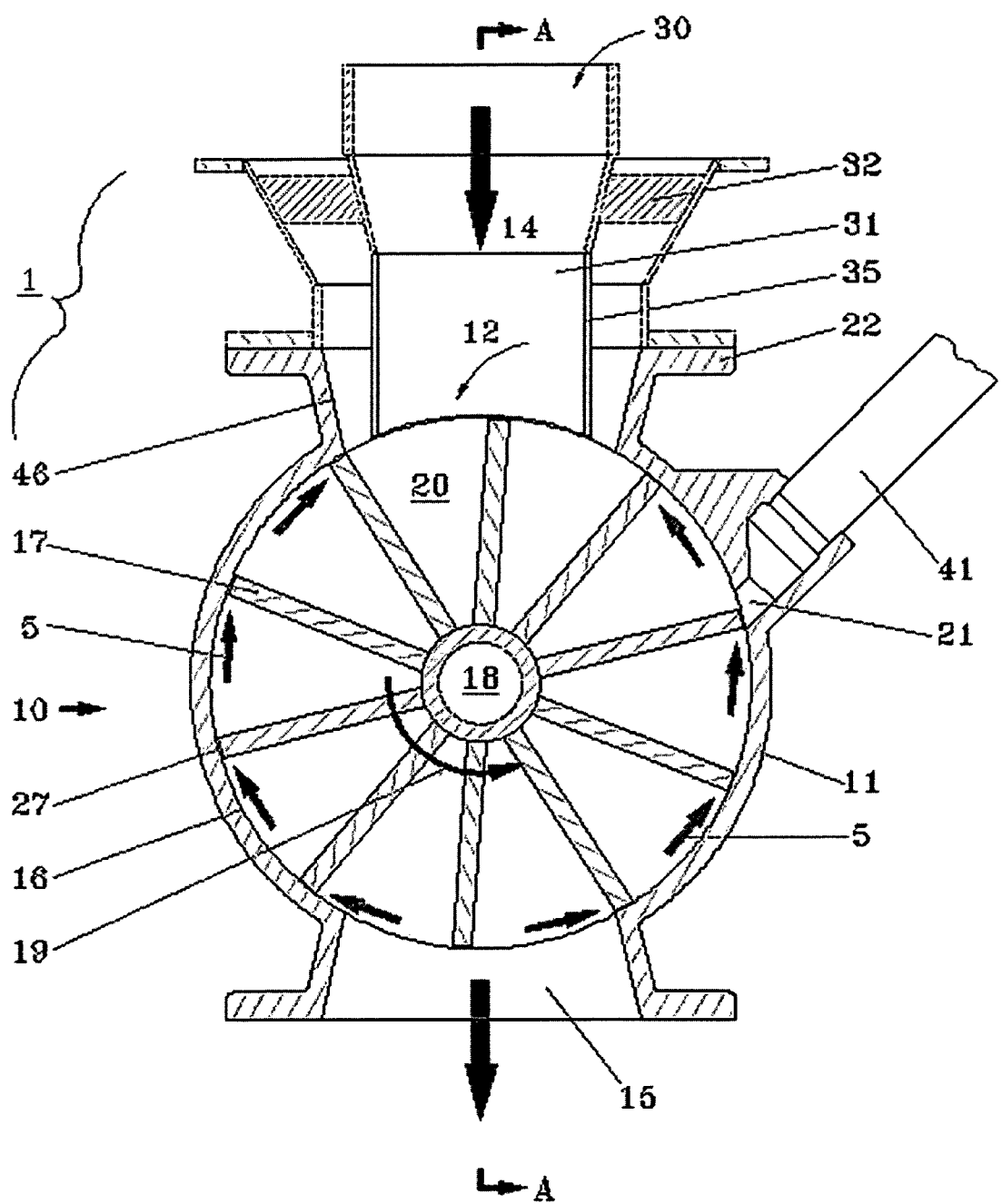
FIG. 1 illustrates a cross-sectional side view of a feeder assembly of the present invention comprising a rotary feeder and feed tube.

With referenced to FIG. 1, feeder assembly 1 of the present invention is comprised in combination of rotary feeder 10, material feed tube 30 for feeding bulk material, such as by gravity, into rotary feeder 10.

Rotary feeder 10 comprises a generally hollow housing 11 having an inlet area 12 that has a generally circular perimeter 13 (FIG. 4) having an inner wall 46, through which inlet area 12 bulk material enters into feeder 10 in the direction of arrow 14, and an outlet area 15 circumferentially separated in housing 11 from inlet area 12 for discharging the bulk material to a high-pressure conveying means (not shown) which is a source of leakage gas into the rotary feeder through said outlet 15 in countercurrent direction to the flow of material out from the feeder. Housing 11 has a substantially circular cylindrical inner wall surface 16 when seen in the cross-sectional view of FIG. 1. A plurality of vanes 17 (ten are shown in the depicted embodiment), extend from and are supported rotatably about an axis defined by a central shaft 18, which extends preferably, but not necessarily, in a substantially horizontal direction, and which has a direction of rotation indicated by arrow 19. The vanes typically extend along the entire axial length of the central shaft. Each adjacent pair of vanes 17 define the side walls of a pocket 20. Vanes 17 are shown to extend straight in radial directions, but can have any other shapes as is known to those skilled in the art.

In operation, the respective upper-most pocket 20 takes a volume of bulk material from feed tube 30, the feed spout 31 of which extends into inlet area 12. Feed tube 30 is maintained in a stationary position relative to feeder inlet 12 by gusset plate 32 which is attached to flange 22, although numerous other means known to the art of fixing feed spout 30 as stationary can be employed. Rotary feeder inlet area 12 is subjected to a relative low gas pressure, as compared with that prevailing in outlet area 15.

As the filled upper-most pocket 17 rotates in the direction of arrow 19, it moves downwards (left side of FIG. 1) with respect to the shaft about its axis of rotation and reaches the opening of outlet area 15 which is subjected to a relatively high gas pressure in comparison with that of feed tube 30. In this position, the bulk material filling the respective pocket 20 is discharged from the pocket by gravity (or by any other means, if the shaft 18 is not horizontal), and is replaced by a corresponding volume of gas under high pressure. As pocket 20 moves up again (right side of FIG. 1), it comes in communication with pocket venting opening 21, which is arranged before inlet area 12 (when seen in the direction of rotation according to arrow 19). Pocket venting opening 21 will preferably be in communication via conduit 41 with a recovery device (not depicted) such as a baghouse into which the conveying gas entrapped in pocket 17 will be discharged for cleaning and eventual release to the atmosphere or a venting chamber. Optionally, any bulked solids entrained in such vented gas can be first separated from the gas and returned to the rotary feeder.

In addition, leakage air from the pneumatic conveying line is shown in FIG. 1 to travel adjacent to the inner wall surface 16 of the rotary feeder beyond the outer edges 27 of vanes 17 in the directions generally depicted by arrows 5. In prior art feeders such leakage air would typically find its way to the material inlet and would interfere with the efficient loading of light weight bulk solids into the feeder.

Figure 2:
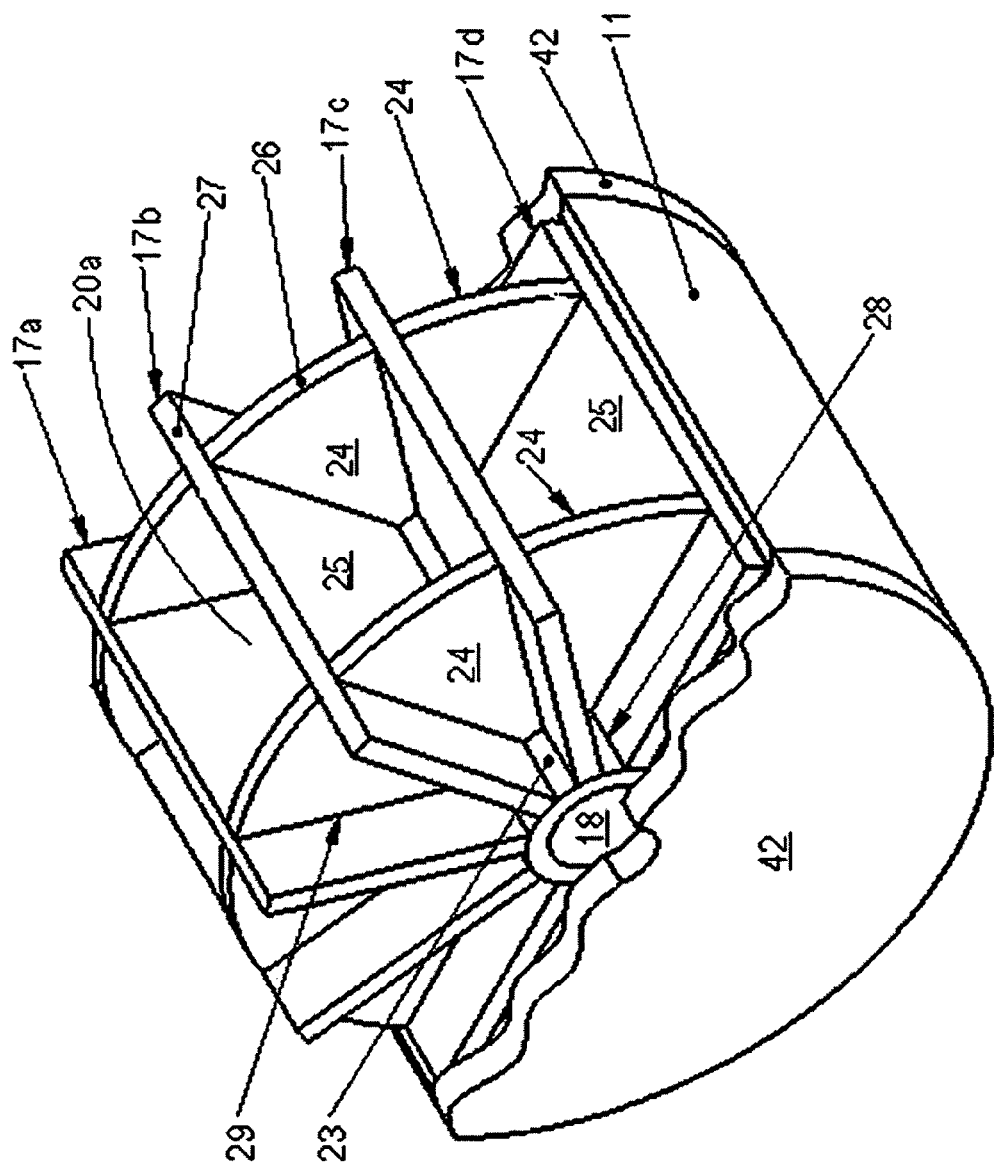
FIG. 2 is a side elevational view, partially in cutaway, of the rotor and pockets in a rotary feeder employed in the feeder assembly of the present invention.

FIG. 2 depicts a rotor assembly driven by a motor (not shown) comprised of rotor 23 that is rotatably supported on a horizontal central shaft 18. Also depicted is generally cylindrical housing 11 and end walls 42 located at opposite ends of the housing. Rotor 19 has a plurality of radially extending attached vanes 17, individually specified as 17a, 17b, 17c, 17d etc. which are preferably, but not necessarily equally spaced from each other, wherein each pair of adjacent vanes, 17a and 17b for example, form an open ended V-shaped pocket 20a that, when facing upwardly, is adaptable to receive material from the feed tube at the material inlet, to rotate with rotor 23 and, when facing downwardly, to deliver the material to a pneumatic conveyor (not shown). In the present invention each pocket 20 is further defined by a pair of opposed end walls 24 which also radically extend from rotor 19 and further are placed at substantially right angles from sidewalls 25 of each of the adjacent vanes 17 to which they are attached, and serve to completely close off the sides of each pocket 20. Outer edge 26 of each end wall is generally level with outer edges 27 of the vanes 17 to which it is attached, and inner edge 28 and side edges 29 of each end wall lie flush against the surface of rotor 23 and vane side walls 25, respectively. Preferably, (a) each set of opposed end walls of a particular pocket are parallel to each other; (b) each set of opposed end walls in a particular pocket are the same distance apart as they are in every other pocket in the feeder; and (c) adjacent end walls in adjacent pockets are aligned and coplanar with each other.

Figure 3:
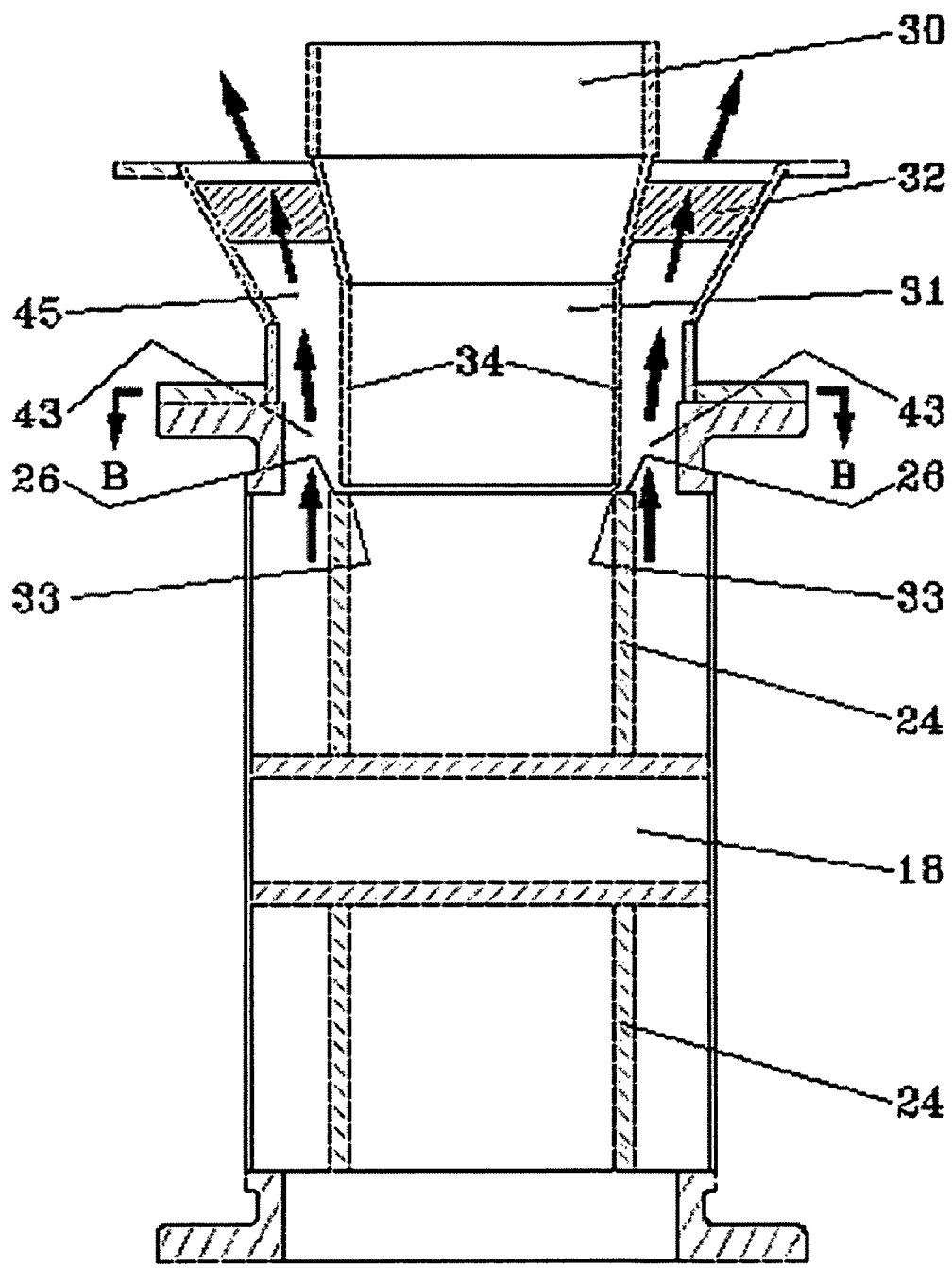
FIG. 3 illustrates another cross-sectional view of the feeder assembly of the present invention taken in the direction of the arrows as seen from line A-A in FIG. 1.

An important feature of the feeding assembly of the present invention is that end walls of each rotating feed pocket are identically placed relative to each other and the rotor and that the end walls of the feed spout are closely aligned with the end walls of the rotating feed pockets. Reference is made to FIG. 3, a cross sectional view along line A-A in FIG. 1. Feed spout 31 remains stationary while in operation, and there is very close clearance (which in the preferred embodiment ranges from about 0.01" to about 0.10", and most preferably from about 0.02" to about 0.03") between the outer edges 33 of the end walls 34 of feed tube 30 and the outer edges 26 of each end wall 24 of the rotating feed pockets, minimizing the migration of feed material outside of the feed pockets. Further, there is a space 43 between end walls 34 of the feed spout and the inner wall 46 of the material inlet which serves as a pathway, depicted by arrows 45, through which leakage air will exit rotary feeder 10 without coming into contact with material as it enters the rotary feeder.

Figure 4:
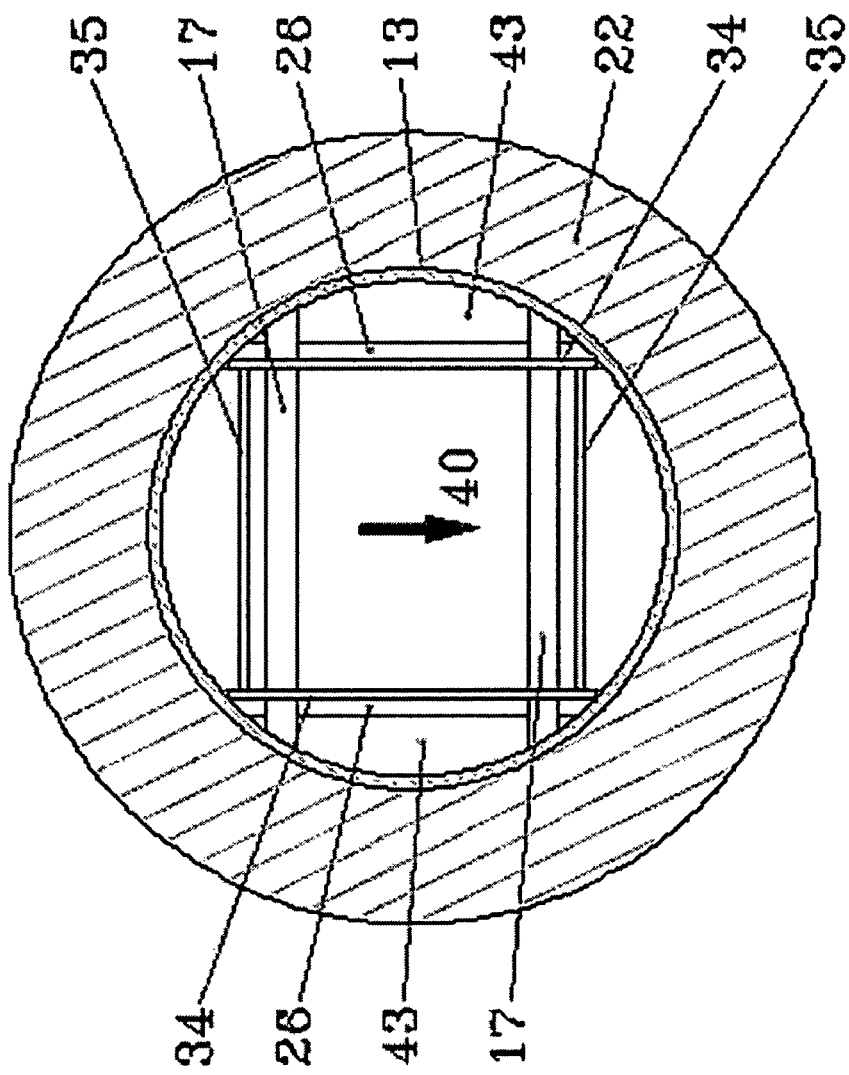
FIG. 4 illustrates a cross-sectional view of the inlet of the rotary feeder utilized in the feed assembly of the present invention as seen from line C-C in FIG. 2.

Reference is made to FIG. 4, a cross sectional view downward into inlet area 12 along line B-B of FIG. 3. The direction of rotation of the rotor is depicted by arrow 40. Rotary inlet 12, similar to rotary outlet 13, has a substantially circular circumference 13. Also depicted are the two end walls 34 and two side walls 35 of feed spout 31, which in combination provides feed spout 31 with a rectangular cross section. Each end wall 34 is closely aligned with and essentially is directly over a corresponding outer edge 26 of the end walls 24 of each rotating feed pocket, with the distance separating opposed end walls 34 being essentially equal to the distance separating a pair of opposed end walls of each rotating feed pockets 20. FIG. 4 depicts a preferred embodiment of the invention in which the distance separating opposite feed tube side walls 35 is slightly greater than the distance separating adjacent vanes 17. This feature maximizes the volume of material fed into each pocket 20.

A pair of openings 43 on opposite sides of inlet area 12 of the rotary feeder housing which are located outside of feed pockets 17 and, more specifically, between the end walls 34 of the feed spout and inner wall 46 of inlet area 12, provide a pathway through which leakage gas can be vented from pocket vent opening through the body of the rotary feeder. It is a feature of this invention that by provided a pathway for leakage gas out of the rotary feeder through opening 43 such leakage gas traveling in the direction from the high pressure outlet to the low pressure inlet of the feeder will essentially not come into contact with any bulk material being fed into the rotary feeder. Leakage gas exiting 43 will preferably be eventually directed to a recovery device.

In summary FIGS. 1 and 3 in combination illustrate the preferred venting of leakage air out of rotary feeder 10 utilizing the apparatus of the present invention. Leakage gas that enters a pocket 17 at the material outlet while feed is charged into a conveying line is be vented out of pocket 17 via pocket venting opening 18, and leakage gas that travels via other pathways through the feeder such as between the vanes and the inner surface of the housing and/or between the vanes and the end walls of the housing will exit the housing through openings 43 located in the material inlet of the feeder. Using the apparatus of the present invention gas leakage from the high pressurized conveying line, such as a pneumatic conveying line is effectively separated from coming into contact with bulk material as it enters the rotary feeder.

The range of blade and pocket configurations is similar to that of conventional rotary feeders. Adjustable blades may be used instead of fixed blades. Although ten blades per rotor are depicted, from six to twelve blades may generally be utilized.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

What is claimed is:

1. A feeder assembly comprising:
   a) a rotary feeder comprising
      (i) a housing;
      (ii) a material inlet for receiving bulk material into the housing and adaptable to be connected to a comparatively low pressure side, said material inlet having an inner wall;
      (iii) a material outlet separated in the housing from the inlet and adaptable to be connected to a comparatively high pressure side;
      (iv) a rotor assembly which is located in the housing and is supported for rotation in a predetermined direction about an axis; and
      (v) a plurality of material receiving pockets that extend radially from the rotor assembly and are rotatable around the axis of rotation, said pockets being adapted to receive bulk material from the material inlet and to discharge said material into the material outlet, each pocket partially defined by a pair of opposed end walls; and
   b) a feed spout extended into the material inlet for feeding bulk material into the inlet, said feed spout having a pair of opposed end walls that are adaptable to be closely aligned with the end walls of a rotatable pocket in the feeder when said pocket is positioned to receive bulk material, wherein there is a space between each end wall of the feed spout and the adjacent inner wall of the material inlet, which space is adaptable to vent leakage gas from the rotary feeder without such leakage gas contacting the bulk material entering the feeder.

2. The feed assembly of claim 1 wherein the rotary feeder has from 6 to 12 pockets.

3. The feed assembly of claim 1 wherein the rotary feeder has 10 pockets.

4. The feed assembly of claim 1 wherein the rotary feeder further comprises at least one venting opening for venting said rotatable pockets, said venting opening being arranged in said housing before said material inlet when seen in the direction of rotation of the pockets.

5. The feed assembly of claim 1 wherein each pocket is further defined by a pair of radially extending vanes that form opposing side walls of each pocket.

6. The feed assembly of claim 5 wherein the end walls of the pockets extend between and at right angles from said adjacent vanes.

7. The feed assembly of claim 5 wherein the vanes are equally spaced from each other.

8. The feed assembly of claim 1 wherein the housing has a substantially circular cylindrical inner wall surface defining the periphery thereof.

9. The feed assembly of claim 1 wherein the feed spout has a rectangular cross section.

10. The feed assembly of claim 1 wherein the end walls of the feed spout are spaced from about 0.01" to about 0.10" from the end walls of each rotating pocket in the feeder.

11. The feed assembly of claim 1 wherein the end walls of the feed spout are spaced from about 0.02" to about 0.03" from the end walls of each rotating pocket in the feeder.

* * * * *